(12) United States Patent
Hart

(10) Patent No.: US 11,817,017 B2
(45) Date of Patent: Nov. 14, 2023

(54) TRAFFIC SAFETY SIGN ASSEMBLY

(71) Applicant: Roger Hart, Kansas City, MO (US)

(72) Inventor: Roger Hart, Kansas City, MO (US)

( * ) Notice: Subject to any disclaimer, the term of this patent is extended or adjusted under 35 U.S.C. 154(b) by 109 days.

(21) Appl. No.: 17/584,015

(22) Filed: Jan. 25, 2022

(65) Prior Publication Data

US 2023/0237938 A1 Jul. 27, 2023

(51) Int. Cl.
 G09F 13/04 (2006.01)
 B60Q 1/50 (2006.01)
 B60Q 7/02 (2006.01)
 G09F 13/22 (2006.01)

(52) U.S. Cl.
 CPC .......... *G09F 13/044* (2021.05); *B60Q 1/525* (2013.01); *B60Q 7/02* (2013.01); *G09F 13/22* (2013.01)

(58) Field of Classification Search
None
See application file for complete search history.

(56) References Cited

U.S. PATENT DOCUMENTS

| | | | | |
|---|---|---|---|---|
| 3,479,641 A * | 11/1969 | Summers | ......... | G08G 1/096783 40/550 |
| 3,622,980 A * | 11/1971 | Elledge, Jr. | ...... | G08G 1/096783 340/908 |
| 3,747,063 A * | 7/1973 | Hudson, Jr. | ...... | G08G 1/096783 340/331 |
| 3,984,810 A * | 10/1976 | Hudson, Jr. | .......... | H05B 47/155 40/550 |
| 4,055,012 A * | 10/1977 | Cote | .......... | G09F 3/20 40/594 |
| 4,607,444 A * | 8/1986 | Foster | .......... | B60Q 1/503 40/550 |
| 5,097,612 A * | 3/1992 | Williams | ............ | E01F 9/662 40/550 |
| 5,224,439 A * | 7/1993 | O'Connell | ............ | B60Q 7/02 40/621 |
| 5,648,756 A * | 7/1997 | Zadok | ............ | B60Q 1/302 340/464 |
| 6,446,375 B1 * | 9/2002 | Davis | .......... | G09F 3/203 40/591 |
| 6,511,193 B1 | 1/2003 | Furr | | |
| 7,477,140 B1 * | 1/2009 | Booth | .......... | B60Q 1/52 345/82 |
| 7,937,866 B1 | 5/2011 | Brown | | |
| D843,869 S * | 3/2019 | Kale | .......... | D10/109.1 |
| 10,556,537 B2 * | 2/2020 | John | .......... | B60Q 1/50 |

(Continued)

FOREIGN PATENT DOCUMENTS

EP 2642473 3/2013

*Primary Examiner* — Fekadeselassie Girma

(57) ABSTRACT

A traffic safety sign assembly for guiding traffic around a vehicle parked on a shoulder of a roadway includes a sign that is positionable on a vehicle that is parked on a shoulder of a roadway. In this way the sign is visible to oncoming traffic on the roadway. Arrow indicia are printed on the sign to direct oncoming traffic away from the vehicle. A plurality of sign light emitters is each integrated into the sign to emit light outwardly from the sign. In this way the sign light emitters enhance visibility of the sign for the oncoming traffic. The plurality of sign light emitters is strategically arranged on the sign to indicate a preferred direction of travel. In this way the sign light emitters visually communicate the preferred direction of travel to the oncoming traffic.

12 Claims, 5 Drawing Sheets

(56) References Cited

U.S. PATENT DOCUMENTS

| | | | |
|---|---|---|---|
| 2004/0148830 A1 | 8/2004 | Baskerville | |
| 2008/0284578 A1* | 11/2008 | Mouratidis | G09F 21/04 340/468 |
| 2014/0002260 A1* | 1/2014 | Wright | B60Q 1/50 340/468 |
| 2017/0057407 A1* | 3/2017 | Gee | B60Q 1/50 |
| 2017/0240096 A1* | 8/2017 | Ross | G05D 1/0212 |
| 2017/0338975 A1* | 11/2017 | Elzner | H04L 12/40013 |

* cited by examiner

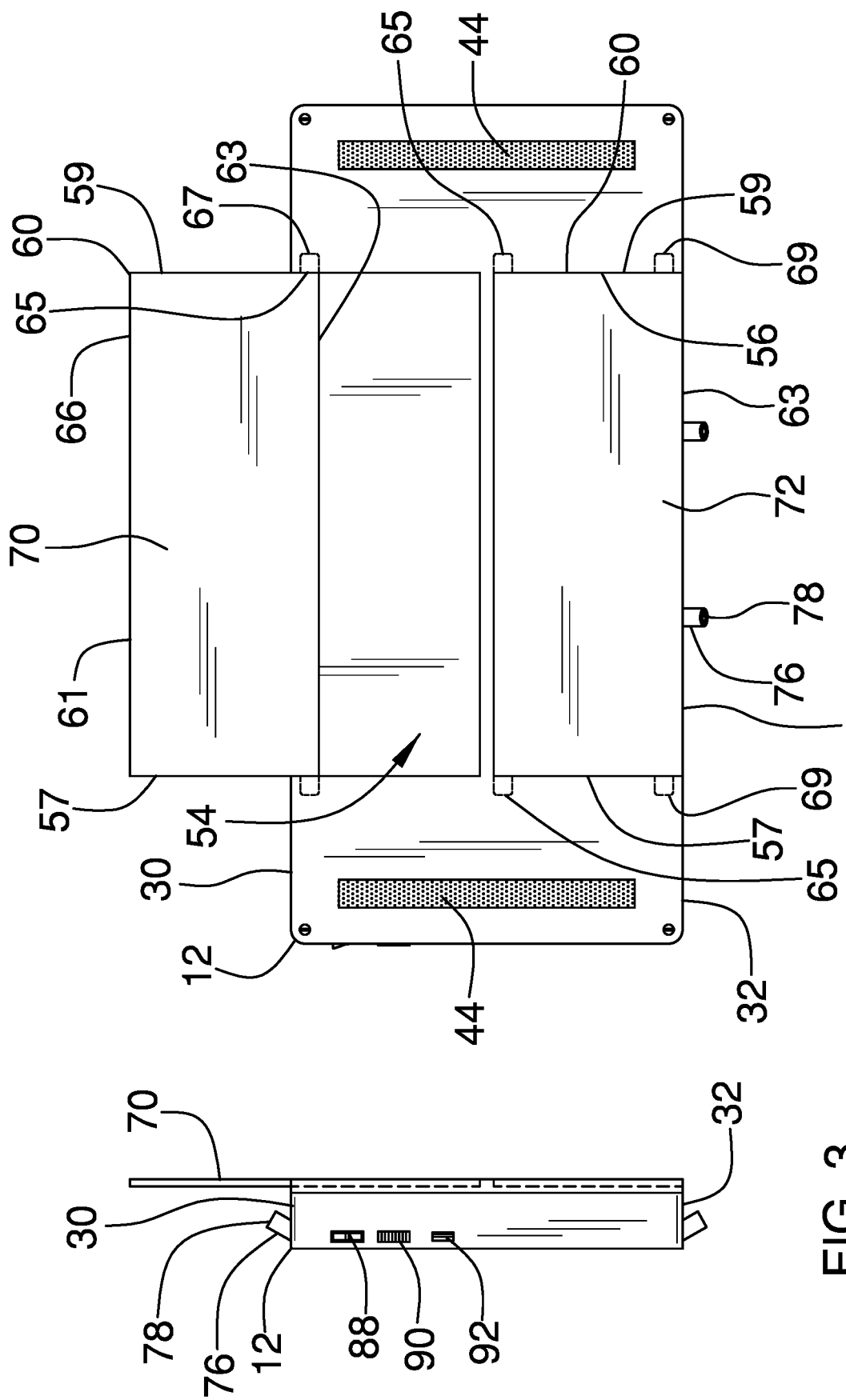

TRAFFIC SAFETY SIGN ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to traffic sign devices and more particularly pertains to a new traffic sign device for guiding traffic around a vehicle parked on a shoulder of a roadway. The device includes a sign with light emitters arranged to define an arrow and the sign is positioned on the vehicle in a respective orientation to guide traffic away from the vehicle. Additionally, the device includes a pair of panels, each with the words "NEED HELP!" printed thereon, are each selectively deployable on the sign to alert passing motorists to call for help.

(2) Description of Related Art Including Information Disclosed Under 37 CFR 1.97 and 1.98

The prior art relates to traffic sign devices including a sign comprised of a flexible material including a plurality of light emitters arranged to spell a word. The prior art discloses a warning sign having an arrow being printed thereon and a plurality of light emitters surrounding the arrow. The prior art discloses a brightly colored panel with a cable for locking a door of a vehicle. The prior art discloses a hazard sign comprising an inverted triangle that can be positioned for display on a vehicle. The prior art discloses a magnetic signboard for displaying a hand written message on a vehicle.

BRIEF SUMMARY OF THE INVENTION

An embodiment of the disclosure meets the needs presented above by generally comprising a sign that is positionable on a vehicle that is parked on a shoulder of a roadway. In this way the sign is visible to oncoming traffic on the roadway. Arrow indicia are printed on the sign to direct oncoming traffic away from the vehicle. A plurality of sign light emitters is each integrated into the sign to emit light outwardly from the sign. In this way the sign light emitters enhance visibility of the sign for the oncoming traffic. The plurality of sign light emitters is strategically arranged on the sign to indicate a preferred direction of travel. In this way the sign light emitters visually communicate the preferred direction of travel to the oncoming traffic.

A pair of panels is each hingedly coupled to the sign and each of the panels has alert indicia printed thereon. Each of the panels is positionable in a deployed position having the panel extending away from the sign. In this way the panel that is deployed is visible to the oncoming traffic. Conversely, each of the panels is positionable in a stored position having the panels lying against the sign. A pair of panel light emitters is each coupled to the sign to emit light outwardly from the sign. Each of the panel light emitters is angled toward a respective one of the panels when the respective panel is in the deployed position. In this way the panel light emitters can illuminate the respective panel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a left side view of an embodiment of the disclosure.

FIG. 4 is a back view of an embodiment of the disclosure.

DETAILED DESCRIPTION OF THE INVENTION

Figure 1:
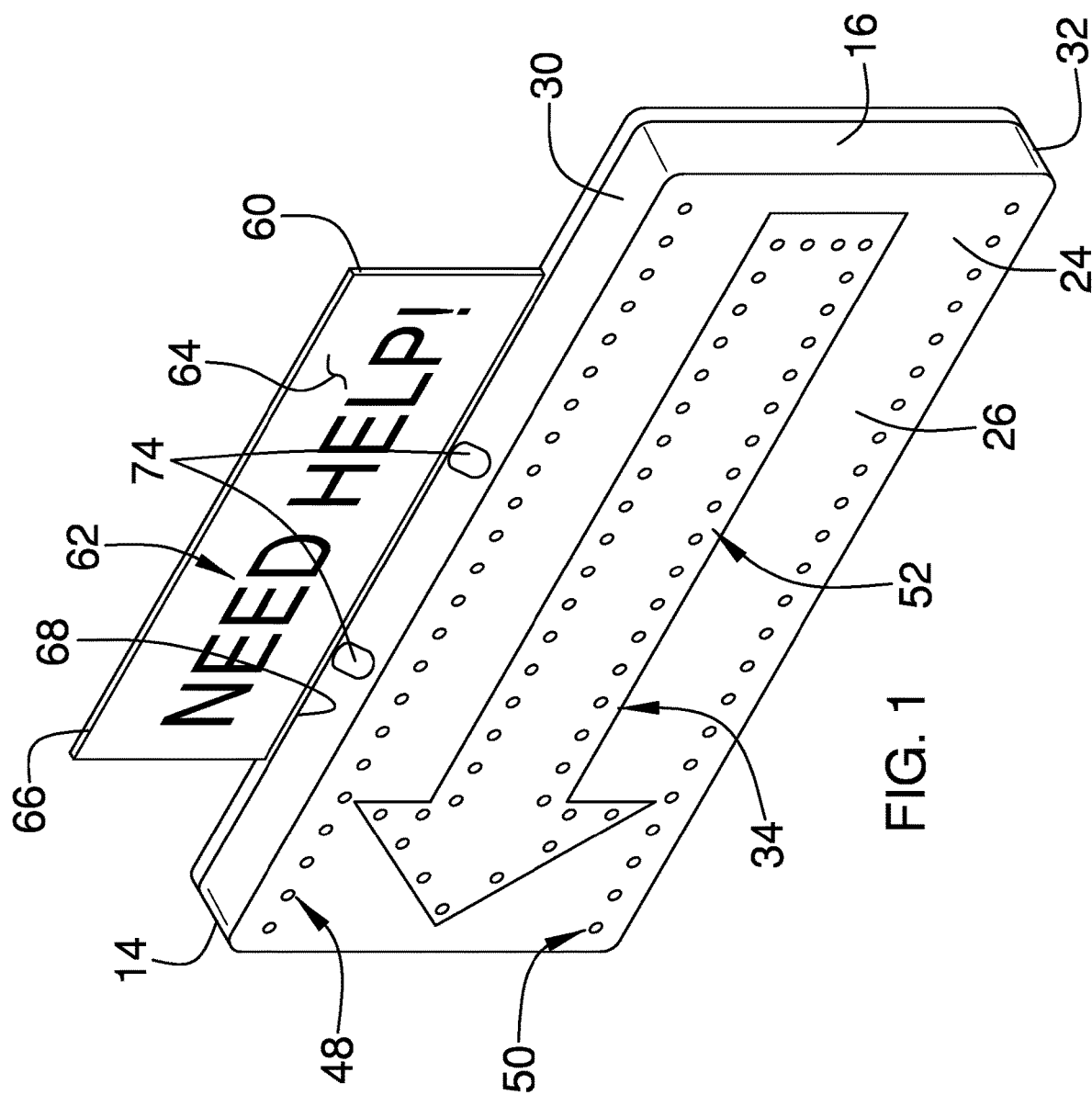
FIG. 1 is a front perspective view of a traffic safety sign assembly according to an embodiment of the disclosure.
Figure 2:
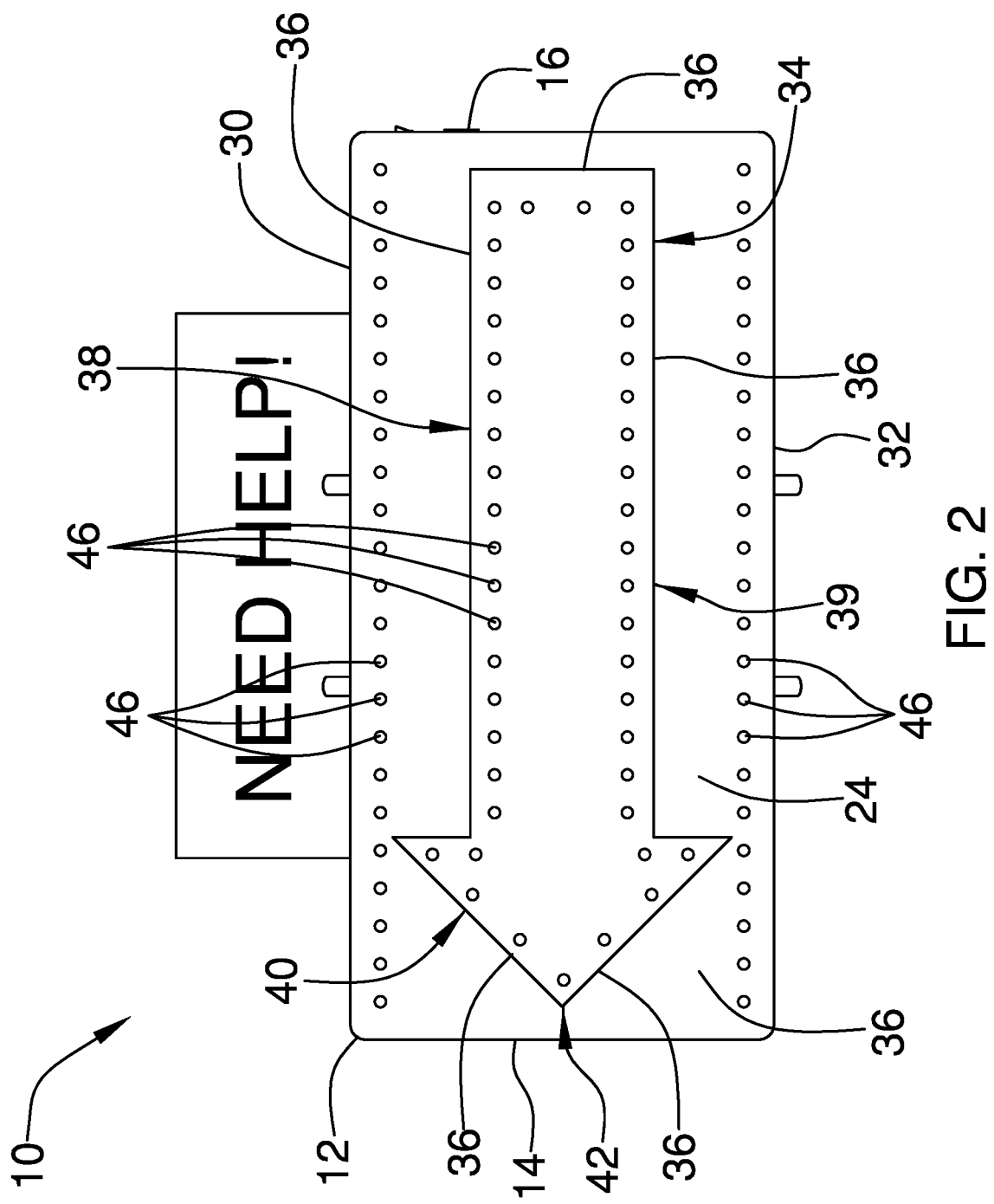
FIG. 2 is a front view of an embodiment of the disclosure.
Figure 5:
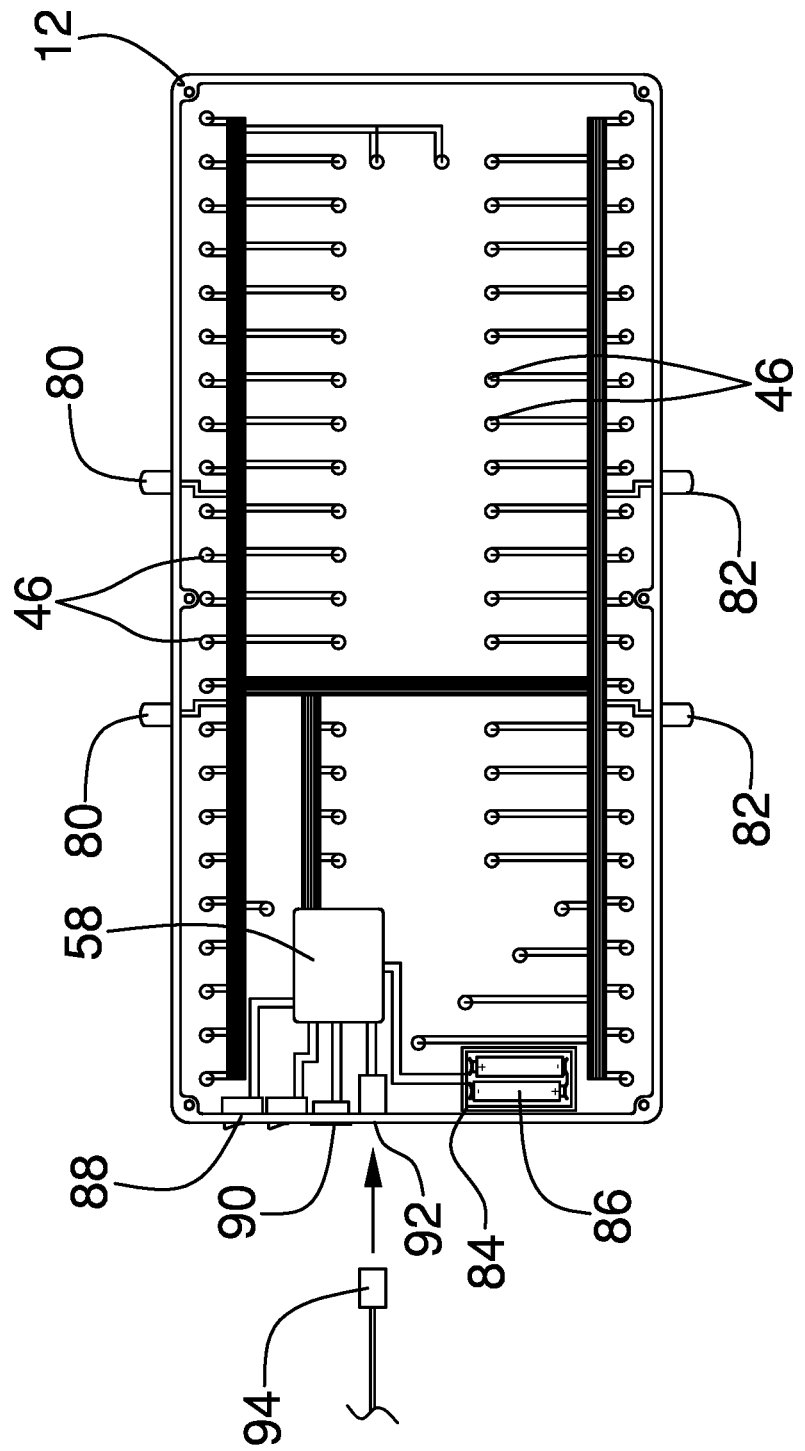
FIG. 5 is a front cutaway view of an embodiment of the disclosure.
Figure 6:
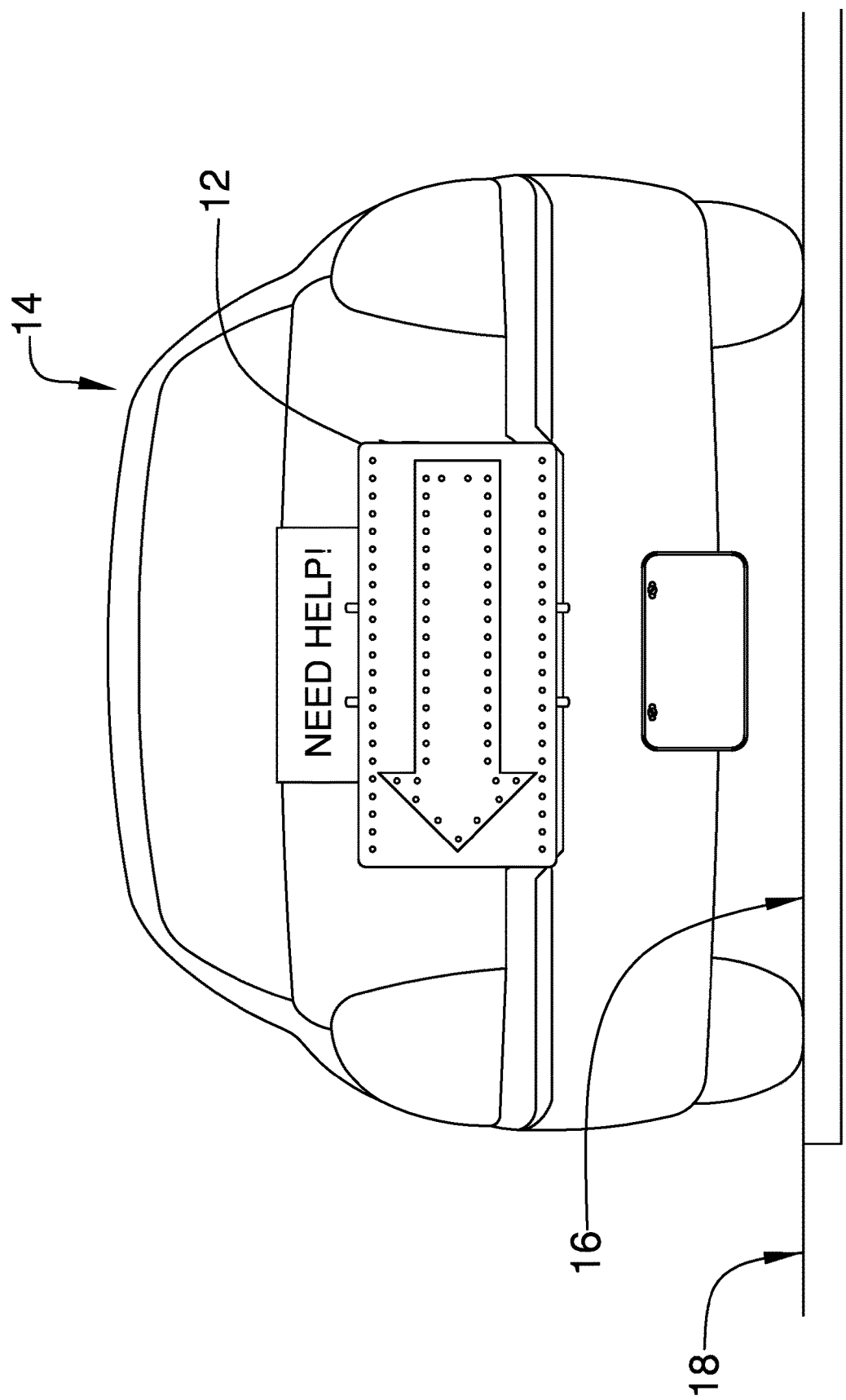
FIG. 6 is a perspective in-use view of an embodiment of the disclosure.

With reference now to the drawings, and in particular to FIGS. 1 through 6 thereof, a new traffic sign device embodying the principles and concepts of an embodiment of the disclosure and generally designated by the reference numeral 10 will be described.

As best illustrated in FIGS. 1 through 6, the traffic safety sign assembly 10 generally comprises a sign 12 that is positionable on a vehicle 14 that is parked on a shoulder 16 of a roadway 18. In this way the sign 12 is visible to oncoming traffic on the roadway 18. The roadway 18 may be a state highway, an interstate highway or any other public roadway with motor vehicle traffic. The sign 12 has a first end 20, a second end 22 and an outer wall 24 extending between the first end 20 and the second end 22, and the outer wall 24 has a front side 26, a back side 28, a top side 30 and a bottom side 32.

The sign 12 is elongated between the first end 20 and the second end 22, and the sign 12 has arrow indicia 34 printed thereon to point 42 in a selected direction when the sign 12 is positioned on the vehicle 14. In this way the oncoming traffic can be directed away from the vehicle 14. The sign 12 is positionable in a first position having the arrow indicia 34 pointing to the left. In this way the arrow indicia 34 direct oncoming traffic away from the vehicle 14 when the vehicle 14 is parked on the right side of the roadway 18. The sign 12 is positionable in a second position having the arrow indicia 34 pointing to the right. In this way the arrow indicia 34 can direct oncoming traffic away from the vehicle 14 when the vehicle 14 is parked on the left side of the roadway 18.

The arrow indicia 34 comprise a plurality of intersecting lines 36 that are positioned on the front side 26 of the outer wall 24. The intersecting lines 36 are arranged to define stem 38 of an arrow 39 and a head 40 of the arrow 39 which tapers to a point 42. Moreover, the point 42 can be directed toward a preferred direction of the oncoming traffic with respect to the vehicle 14. The arrow 39 is oriented such that the point 42 defined on the head 40 is directed toward the first end 20 of the sign 12.

A pair of mating units 44 is provided and each of the mating units 44 is coupled to the sign 12. Each of the mating units 44 releasably engages the vehicle 14 to retain the sign 12 on the vehicle 14. Each of the mating units 44 is positioned on the back side 28 of the sign 12 and each of the mating units 44 comprises a magnet for magnetically engaging body panels of the vehicle 14. Additionally, each of the mating units 44 is oriented to extend substantially between the top side 30 and the bottom side 32 of the outer wall 24 of the sign 12. Each of the magnets may be a synthetic magnet comprised of a deformable material thereby inhibiting the magnets from scratching paint on the body panels 60 of the vehicle 14.

A plurality of sign light emitters 46 is each integrated into the sign 12 to emit light outwardly from the sign 12 thereby enhancing visibility of the sign 12 for the oncoming traffic. The plurality of sign light emitters 46 is strategically arranged on the sign 12 to indicate a preferred direction of travel. In this way the sign light emitters 46 can visually communicate the preferred direction of travel to the oncoming traffic thereby facilitating the oncoming traffic to drive around the vehicle 14 that is parked on the shoulder 16. Each of the sign light emitters 46 may comprise a light emitting diode or the like.

Each of the sign light emitters 46 is positioned on the front side 26 of the outer wall 24 of the sign 12. Furthermore, the plurality of sign light emitters 46 includes a set of upper sign light emitters 48, a set of lower sign light emitters 50 and a set of arrow sign light emitters 52. The set of upper sign light emitters 48 is spaced apart from each other and is distributed between the first end 20 and the second end 22 of the sign 12. Additionally, the upper sign light emitters 48 are positioned adjacent to the top side 30 of the outer wall 24.

The set of lower sign light emitters 50 is spaced apart from each other and is distributed between the first end 20 and the second end 22 of the sign 12. Additionally, the lower sign light emitters 50 are positioned adjacent to the bottom side 32 of the outer wall 24. The set of arrow sign light emitters 52 is spaced apart from each other and is arranged to extend along each of the intersecting lines 36 defining the stem 38 and the head 40 of the arrow. Each of the sign light emitters 46 is sequentially actuated from the second end 22 of the sign 12 toward the first end 20 of the sign 12. In this way the plurality of sign light emitters 46 visually enhance the preferred direction of travel of the oncoming traffic.

A first recess 54 is recessed into the back side 28 of the outer wall 24 of the sign 12 and the first recess 54 extends from the top side 30 of the outer wall 24 of the sign 12 toward the bottom side of the outer wall 24 of the sign 12. The first recess 54 has a first lateral bounding surface 49 and a second lateral bounding surface 51. A second recess 56 is recessed into the back side 28 of the outer wall 24 of the sign 12 and the second recess 56 extends from the bottom side 32 of the outer wall 24 of the sign 12 toward the first recess 54. The second recess 56 has a first lateral bounding surface 53 and a second lateral bounding surface 55.

A light control circuit 58 is integrated into the sign 12 and each of the sign light emitters 46 is electrically coupled to the light control circuit 58. The light control circuit 58 controls the sequential activation of the plurality of sign light emitters 46. A pair of panels 60 is provided and each of the panels 60 is hingedly coupled to the sign 12. Each of the panels 60 has alert indicia 62 printed thereon and the alert indicia 62 may comprise the words "NEED HELP!". Each of the panels 60 is positionable in a deployed position having the panels 60 extending away from the sign 12. In this way the panel 60 that is deployed is visible to the oncoming traffic. Conversely, each of the panels 60 is positionable in a stored position having the panels 60 being recessed into the sign 12.

Each of the panels 60 has a forward surface 64 and a perimeter edge 66, and the perimeter edge 66 of each of the panels 60 has a first lateral side 57, a second lateral side 59, a top side 61 and a bottom side 63, and the alert indicia 62 is positioned on the forward surface 64. Each of the first lateral side 57 and the second lateral side 59 of each of the panels 60 has an engagement 65 being disposed thereon. The pair of panels 60 includes an upper panel 70 and a lower panel 72, and the upper panel 70 slidably engages the first recess 54. The top side 61 of the perimeter edge 66 of the upper panel 70 is positioned adjacent to the top side 30 of the outer wall 24 of the sign 12 when the upper panel 70 is in the stored position. The upper panel 70 extends upwardly from the top side 30 of the outer wall 24 when the upper panel 70 is in the deployed position. The engagement 65 on each of the first lateral side 57 and the second lateral side 59 of the perimeter edge 66 of the upper panel 70 releasably engages an engagement point 67 in a respective one of the first lateral bounding surface 49 and a second lateral bounding surface 51 of the first recess 54 when the upper panel 70 is in the deployed position for releasably retaining the upper panel 70 in the deployed position.

The lower panel 72 slidably engages the second recess 56 having the bottom side 63 of the perimeter edge 66 of the lower panel 72 being positioned adjacent to the bottom side 32 of the outer wall 24 of the sign 12 when the lower panel 72 is in the stored position. The lower panel 72 extends downwardly from the bottom side 32 of the outer wall 24 of the sign 12 when the lower panel 72 is in the deployed position. The engagement 65 on each of the first lateral side 57 and the second lateral side 59 of the perimeter edge 66 of the lower panel 72 releasably engages an engagement point 69 in a respective one of the first lateral bounding surface 53 and a second lateral bounding surface 55 of the second recess 56 when the lower panel 72 is in the deployed position for releasably retaining the lower panel 72 in the deployed position. The lower panel 72 is positioned in the deployed position when the sign 12 is positioned in the first position, and the upper panel 70 is positioned in the deployed position when the sign 12 is positioned in the second position.

A pair of panel light emitters 74 is each coupled to the sign 12 to emit light outwardly from the sign 12. Each of the panel light emitters 74 is angled toward a respective one of the panels 60 when the respective panel 60 is in the deployed position to illuminate the respective panel 60. Each of the pair of panel light emitters 74 includes a housing 76 and a lens 78 that is disposed on the housing 76, and the pair of panel light emitters 74 includes an upper light emitter 80 and a lower light emitter 82. The housing 76 associated with the upper light emitter 80 is positioned on the top side 30 of the outer wall 24 of the sign 12. Additionally, the housing 76 associated with the upper light emitter 80 is angled toward the back side 28 of the outer wall 24 of the sign 12 to illuminate the upper panel 70 when the upper panel 70 is in the deployed position. The housing 76 associated with the lower light emitter 82 is positioned on the bottom side 32 of the outer wall 24 of the sign 12. Furthermore, the housing 76 associated with the lower light emitter 82 is angled toward the back side 28 of the outer wall 24 of the sign 12 to illuminate the lower panel 72 when the lower panel 72 is in the deployed position.

A power supply 84 is integrated into the sign 12 and the power supply 84 is electrically coupled to the light control circuit 58. The power supply 84 comprises a least one rechargeable battery 86 that is positioned in the sign 12 and the at least one rechargeable battery 86 is electrically coupled to the light control circuit 58. A power button 88 is slidably integrated into the outer wall 24 of the sign 12 and the power button 88 is electrically coupled to the light control circuit 58. The power button 88 turns the light control circuit 58 on or off when the power button 88 is positioned in a corresponding on position or off position. The power supply 84 includes a battery level indicator 90 that is positioned on the outer wall 24 of the sign 12. The battery level indicator 90 is electrically coupled to the at least one rechargeable battery 86 for indicating a charge level of the at least one rechargeable battery 86. A charge port 92 is recessed into the outer wall 24 of the sign 12 to receive a charge cord 94 of a charger and the charge port 92 is electrically coupled to the at least one rechargeable battery 86.

In use, the sign 12 is positioned on the vehicle 14 the vehicle 14 is parked on the shoulder 16 of the roadway 18. Additionally, the sign 12 is positioned in either the first position or the second position, depending on which side of the roadway 18 the vehicle 14 is parked. In this way the arrow 39 is oriented to point 42 in the direction that will lead oncoming traffic away from the vehicle 14. The power button 88 is turned on to actuate the sign light emitters 46 to visually alert the oncoming traffic to drive away from the vehicle 14. Additionally, either the upper panel 70 or the lower panel 72 is positioned in the deployed position, depending on whether the sign 12 is in the first position or the second position. In this way the oncoming traffic is alerted to call for help to assist the vehicle 14 that is parked on the shoulder 16 of the roadway 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A traffic safety sign assembly for alerting traffic to a vehicle parked on a shoulder of a roadway, said assembly comprising:

a sign being positionable on a vehicle that is parked on a shoulder of a roadway wherein said sign is configured to be visible to oncoming traffic on the roadway, said sign having arrow indicia being printed thereon wherein said arrow indicia is configured to point in a selected direction when said sign is positioned on the vehicle thereby directing oncoming traffic away from the vehicle, said sign being positionable in a first position having said arrow indicia pointing to the left wherein said arrow indicia is configured to direct oncoming traffic away from the vehicle when the vehicle is parked on the right side of the roadway, said sign being positionable in a second position having said arrow indicia pointing to the right wherein said arrow indicia are configured to direct oncoming traffic away from the vehicle when the vehicle is parked on the left side of the roadway;

a plurality of sign light emitters, each of said sign light emitters being integrated into said sign wherein each of said sign light emitters is configured to emit light outwardly from said sign thereby enhancing visibility of said sign for the oncoming traffic, said plurality of sign light emitters being strategically arranged on said sign to indicate a preferred direction of travel wherein said sign light emitters are configured to visually communicate the preferred direction of travel to the oncoming traffic thereby facilitating the oncoming traffic to drive around the vehicle that is parked on the shoulder;

a pair of panels, each of said panels being slidably integrated into said sign, each of said panels having alert indicia being printed thereon, each of said panels being positionable in a deployed position having said panel extending away from said sign wherein said panel that is deployed is configured to be visible to the oncoming traffic, each of said panels being positionable in a stored position having said panels being recessed into said sign; and a pair of panel light emitters, each of said panel light emitters being coupled to said sign wherein each of said panel light emitters is configured to emit light outwardly from said sign, each of said panel light emitters being angled toward a respective one of said panels when said respective panel is in said deployed position wherein said panel light emitters is configured to illuminate said respective panel.

2. The assembly according to claim 1, wherein:
said sign has a first end, a second end and an outer wall extending between said first end and said second end, said outer wall having a front side, a back side, a top side and a bottom side, said sign being elongated between said first end and said second end;
said back side of said sign has a first recess extending from said top side toward said bottom side, said first recess having a first lateral bounding surface and a second lateral bounding surface;
said back side of said sign has a second recess extending from said bottom side toward said first recess, said second recess having a first lateral bounding surface and a second lateral bounding surface;
said arrow indicia comprise a plurality of intersecting lines being positioned on said front side of said outer wall, said intersecting lines being arranged to define stem of the arrow and a head of the arrow which tapers to a point wherein said point is configured to be directed toward a preferred direction of the oncoming traffic with respect to the vehicle, said arrow being oriented such that said point defined on said head is directed toward said first end of said sign; and
said assembly includes a pair of mating units, each of said mating units being coupled to said sign, each of said mating units releasably engaging the vehicle to retain said sign on the vehicle, each of said mating units being positioned on said back side of said sign, each of said mating units comprising a magnet for magnetically engaging body panels of the vehicle, each of said mating units being oriented to extend substantially between said top side and said bottom side of said outer wall of said sign.

3. The assembly according to claim 2, wherein:
each of said sign light emitters is positioned on said front side of said outer wall of said sign, said plurality of sign light emitters including a set of upper sign light emitters, a set of lower sign light emitters and a set of arrow sign light emitters;
said set of upper sign light emitters is spaced apart from each other and being distributed between said first end and said second end of said sign, said upper sign light emitters being positioned adjacent to said top side of said outer wall;
said set of lower sign light emitters is spaced apart from each other and being distributed between said first end and said second end of said sign, said lower sign light emitters being positioned adjacent to said bottom side of said outer wall; and
said set of arrow sign light emitters are spaced apart from each other and being arranged to extend along each of said intersecting lines defining said stem and said head of said arrow, each of said sign light emitters being sequentially actuated from said second end of said sign toward said first end of said sign wherein said plurality of sign light emitters is configured to visually enhance the preferred direction of travel of the oncoming traffic.

4. The assembly according to claim 2, wherein:
each of said panels has a forward surface and a perimeter edge, said alert indicia being positioned on said forward surface, said perimeter each of each of said panels having a first lateral side, a second lateral side, a top side and a bottom side, each of said first lateral side and said second lateral side of each of said panels having an engagement being disposed thereon;
said pair of panels includes an upper panel and a lower panel; and
said upper panel is slidably positioned in said first recess in said back side of said outer wall of said sign, said top side of said perimeter edge of said upper panel being aligned with said top side of said outer wall of said sign when said upper panel is positioned in said stored position, said upper panel extending upwardly from said top side of said outer wall of said sign when said upper panel is in said deployed position.

5. The assembly according to claim 4, wherein said engagement on each of said first lateral side and said second lateral side of said perimeter edge of said upper panel releasably engages an engagement point in a respective one of said first lateral side and said second lateral side of said first recess when said upper panel is in said deployed position for releasably retaining said upper panel in said deployed position.

6. The assembly according to claim 2, wherein:
each of said panels has a forward surface and a perimeter edge, said alert indicia being positioned on said forward surface, said perimeter each of each of said panels having a first lateral side, a second lateral side, a top side and a bottom side, each of said first lateral side and said second lateral side of each of said panels having an engagement being disposed thereon;
said pair of panels includes an upper panel and a lower panel; and
said lower panel is slidably positioned in said second recess in said back side of said outer wall of said sign, said bottom side of said perimeter edge of said lower panel being aligned with said bottom side of said outer wall of said sign when said lower panel is positioned in said stored position, said lower panel extending upwardly from said top side of said outer wall of said sign when said upper panel is in said deployed position.

7. The assembly according to claim 6, wherein said engagement on each of said first lateral side and said second lateral side of said perimeter edge of said lower panel releasably engages an engagement point in a respective one of said first lateral side and said second lateral side of said second recess when said lower panel is in said deployed position for releasably retaining said lower panel in said deployed position.

8. The assembly according to claim 6, wherein said lower panel can be positioned in said deployed position when said sign is positioned in said first position.

9. The assembly according to claim 4, wherein said upper panel can be positioned in said deployed position when said sign is positioned in said second position.

10. The assembly according to claim 2, wherein:
each of said pair of panel light emitters includes a housing and a lens being disposed on said housing, said pair of panel light emitters including an upper light emitter and a lower light emitter;
said housing associated with said upper light emitter is positioned on said top side of said outer wall of said sign, said housing associated with said upper light emitter being angled toward said back side of said outer wall of said sign wherein said upper light emitter is configured to illuminate said upper panel when said upper panel is in said deployed position; and
said housing associated with said lower light emitter is positioned on said bottom side of said outer wall of said sign, said housing associated with said lower light emitter is angled toward said back side of said outer wall of said sign wherein said lower light emitter is configured to illuminate said lower panel when said lower panel is in said deployed position.

11. The assembly according to claim 2, further comprising:
- a light control circuit, said light control circuit being integrated into said sign, each of said sign light emitters being electrically coupled to said light control circuit, said light control circuit controlling the sequential activation of said plurality of sign light emitters; and
- a power supply being integrated into said sign, said power supply being electrically coupled to said light control circuit, said power supply comprising:
  - at least one rechargeable battery being positioned in said sign, said at least one rechargeable battery being electrically coupled to said light control circuit;
  - a power button being slidably integrated into said outer wall of said sign, said power button being electrically coupled to said light control circuit, said power button turning said light control circuit on or off when said power button is positioned in a corresponding on position or off position;
  - a battery level indicator being positioned on said outer wall of said sign, said battery level indicator being electrically coupled to said at least one rechargeable battery for indicating a charge level of said at least one rechargeable battery; and
  - a charge port being recessed into said outer wall of said sign wherein said charge port is configured to receive a charge cord of a charger, said charge port being electrically coupled to said at least one rechargeable battery.

12. A traffic safety sign assembly for alerting traffic to a vehicle parked on a shoulder of a roadway, said assembly comprising:
- a sign being positionable on a vehicle that is parked on a shoulder of a roadway wherein said sign is configured to be visible to oncoming traffic on the roadway, said sign having a first end, a second end and an outer wall extending between said first end and said second end, said outer wall having a front side, a back side, a top side and a bottom side, said sign being elongated between said first end and said second end, said sign having arrow indicia being printed thereon wherein said arrow indicia is configured to point in a selected direction when said sign is positioned on the vehicle thereby directing oncoming traffic away from the vehicle, said sign being positionable in a first position having said arrow indicia pointing to the left wherein said arrow indicia is configured to direct oncoming traffic away from the vehicle when the vehicle is parked on the right side of the roadway, said sign being positionable in a second position having said arrow indicia pointing to the right wherein said arrow indicia are configured to direct oncoming traffic away from the vehicle when the vehicle is parked on the left side of the roadway, said arrow indicia comprising a plurality of intersecting lines being positioned on said front side of said outer wall, said intersecting lines being arranged to define stem of the arrow and a head of the arrow which tapers to a point wherein said point is configured to be directed toward a preferred direction of the oncoming traffic with respect to the vehicle, said arrow being oriented such that said point defined on said head is directed toward said first end of said sign, said back side of said sign having a first recess extending from said top side toward said bottom side, said first recess having a first lateral bounding surface and a second lateral bounding surface, said back side of said sign having a second recess extending from said bottom side toward said first recess, said second recess having a first lateral bounding surface and a second lateral bounding surface;
- a pair of mating units, each of said mating units being coupled to said sign, each of said mating units releasably engaging the vehicle to retain said sign on the vehicle, each of said mating units being positioned on said back side of said sign, each of said mating units comprising a magnet for magnetically engaging body panels of the vehicle, each of said mating units being oriented to extend substantially between said top side and said bottom side of said outer wall of said sign;
- a plurality of sign light emitters, each of said sign light emitters being integrated into said sign wherein each of said sign light emitters is configured to emit light outwardly from said sign thereby enhancing visibility of said sign for the oncoming traffic, said plurality of sign light emitters being strategically arranged on said sign to indicate a preferred direction of travel wherein said sign light emitters are configured to visually communicate the preferred direction of travel to the oncoming traffic thereby facilitating the oncoming traffic to drive around the vehicle that is parked on the shoulder, each of said sign light emitters being positioned on said front side of said outer wall of said sign, said plurality of sign light emitters including a set of upper sign light emitters, a set of lower sign light emitters and a set of arrow sign light emitters, said set of upper sign light emitters being spaced apart from each other and being distributed between said first end and said second end of said sign, said upper sign light emitters being positioned adjacent to said top side of said outer wall, said set of lower sign light emitters being spaced apart from each other and being distributed between said first end and said second end of said sign, said lower sign light emitters being positioned adjacent to said bottom side of said outer wall, said set of arrow sign light emitters being spaced apart from each other and being arranged to extend along each of said intersecting lines defining said stem and said head of said arrow, each of said sign light emitters being sequentially actuated from said second end of said sign toward said first end of said sign wherein said plurality of sign light emitters is configured to visually enhance the preferred direction of travel of the oncoming traffic;
- a light control circuit being integrated into said sign, each of said sign light emitters being electrically coupled to said light control circuit, said light control circuit controlling the sequential activation of said plurality of sign light emitters;
- a pair of panels, each of said panels being hingedly coupled to said sign, each of said panels having alert indicia being printed thereon, each of said panels being positionable in a deployed position having said panel extending away from said sign wherein said panel that is deployed is configured to be visible to the oncoming traffic, each of said panels being positionable in a stored position having said panels being recessed into said sign, each of said panels having a forward surface and a perimeter edge, said perimeter each of each of said panels having a first lateral side, a second lateral side, a top side and a bottom side, each of said first lateral side and said second lateral side of each of said panels having an engagement being disposed thereon, said alert indicia being positioned on said forward surface, said pair of panels including an upper panel and a lower panel, said upper panel being slidably positioned in said first recess in said back side of said outer wall of said sign, a top side of said perimeter edge of said upper panel being aligned with said top side of said outer wall of said sign when said upper panel is positioned in said stored position, said upper panel extending upwardly from said top side of said outer wall of said sign when said upper panel is in said deployed position, said engagement on each of said first lateral side and said second lateral side of said perimeter edge of said upper panel releasably engages an engagement point in a respective one of said first lateral side and said second lateral side of said first recess when said upper panel is in said deployed position for releasably retaining said upper panel in said deployed position, said lower panel being slidably positioned in said second recess in said back side of said outer wall of said sign, a bottom side of said perimeter edge of said lower panel being aligned with said bottom side of said outer wall of said sign when said lower panel is positioned in said stored position, said lower panel extending downwardly from said bottom side of said outer wall of said sign when said lower panel is in said deployed position, said engagement on each of said first lateral side and said second lateral side of said perimeter edge of said lower panel releasably engages an engagement point in a respective one of said first lateral side and said second lateral side of said second recess when said lower panel is in said deployed position for releasably retaining said lower panel in said deployed position, said lower panel being positionable in said deployed position when said sign is positioned in said first position, said upper panel being positionable in said deployed position when said sign is positioned in said second position;

a pair of panel light emitters, each of said panel light emitters being coupled to said sign wherein each of said panel light emitters is configured to emit light outwardly from said sign, each of said panel light emitters being angled toward a respective one of said panels when said respective panel is in said deployed position wherein said panel light emitters is configured to illuminate said respective panel, each of said pair of panel light emitters including a housing and a lens being disposed on said housing, said pair of panel light emitters including an upper light emitter and a lower light emitter, said housing associated with said upper light emitter being positioned on said top side of said outer wall of said sign, said housing associated with said upper light emitter being angled toward said back side of said outer wall of said sign wherein said upper light emitter is configured to illuminate said upper panel when said upper panel is in said deployed position, said housing associated with said lower light emitter being positioned on said bottom side of said outer wall of said sign, said housing associated with said lower light emitter being angled toward said back side of said outer wall of said sign wherein said lower light emitter is configured to illuminate said lower panel when said lower panel is in said deployed position; and a power supply being integrated into said sign, said power supply being electrically coupled to said light control circuit, said power supply comprising:
at least one rechargeable battery being positioned in said sign, said at least one rechargeable battery being electrically coupled to said light control circuit;
a power button being slidably integrated into said outer wall of said sign, said power button being electrically coupled to said light control circuit, said power button turning said light control circuit on or off when said power button is positioned in a corresponding on position or off position;
a battery level indicator being positioned on said outer wall of said sign, said battery level indicator being electrically coupled to said at least one rechargeable battery for indicating a charge level of said at least one rechargeable battery; and
a charge port being recessed into said outer wall of said sign wherein said charge port is configured to receive a charge cord of a charger, said charge port being electrically coupled to said at least one rechargeable battery.

\* \* \* \* \*